(12) United States Patent
Ljung et al.

(10) Patent No.: US 11,425,087 B2
(45) Date of Patent: Aug. 23, 2022

(54) NETWORK ASSISTANCE IN DASH USING DNS

(71) Applicant: Sony Corporation, Tokyo (JP)

(72) Inventors: Rickard Ljung, Helsingborg (SE); Paul Szucs, Esslingen (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/619,060

(22) PCT Filed: Jun. 7, 2018

(86) PCT No.: PCT/EP2018/065027
§ 371 (c)(1),
(2) Date: Dec. 3, 2019

(87) PCT Pub. No.: WO2018/228916
PCT Pub. Date: Dec. 20, 2018

(65) Prior Publication Data
US 2020/0099652 A1 Mar. 26, 2020

(30) Foreign Application Priority Data
Jun. 7, 2017 (GB) .................................... 1709085

(51) Int. Cl.
*H04L 61/4511* (2022.01)
*H04L 65/612* (2022.01)
(Continued)

(52) U.S. Cl.
CPC ...... *H04L 61/1511* (2013.01); *H04L 65/4084* (2013.01); *H04L 65/80* (2013.01);
(Continued)

(58) Field of Classification Search
None
See application file for complete search history.

(56) References Cited

U.S. PATENT DOCUMENTS

| 2012/0147840 A1* | 6/2012 | Chen ................. H04W 72/1231 370/329 |
| 2016/0105403 A1 | 4/2016 | Giladi |

(Continued)

FOREIGN PATENT DOCUMENTS

| CN | 104854837 A | 8/2015 |
| CN | 106303704 A | 1/2017 |

(Continued)

OTHER PUBLICATIONS

International Search Report and Written Opinion from corresponding International Patent Application No. PCT/EP2018/065027 dated Oct. 9, 2018, 6 pages.
(Continued)

*Primary Examiner* — Jonathan A Bui
*Assistant Examiner* — Mohammad Yousuf A. Mian
(74) *Attorney, Agent, or Firm* — Tucker Ellis LLP

(57) ABSTRACT

A terminal device for use with a telecommunications network, the terminal device comprising receiver circuitry, transmitter circuitry and processing circuitry, wherein the processing circuitry is configured: to control the receiver circuitry to receive data from infrastructure equipment of the network via a first communication path through the network; to control the transmitter circuitry to transmit, via a second, different, communication path through the network, a request to infrastructure equipment of the network requesting information identifying an element of the network configured to perform a predetermined process associated with the transmission of the data to the receiver circuitry; to control the receiver circuitry to receive, from infrastructure equipment of the network via the second communication path, a signal identifying the element of the network configured to perform the predetermined process associated with the transmission of the data to the receiver circuitry;
(Continued)

and to monitor whether a predetermined condition associated with the reception of the data by the receiver circuitry is met and, when it is determined that the predetermined condition is met, to control the transmitter circuitry to transmit a request to infrastructure equipment of the network requesting the identified element of the network to perform the predetermined process associated with the transmission of the data to the receiver circuitry.

7 Claims, 6 Drawing Sheets

(51) Int. Cl.
  *H04L 65/80* (2022.01)
  *H04L 67/147* (2022.01)
  *H04N 21/2343* (2011.01)
  *H04N 21/845* (2011.01)

(52) U.S. Cl.
  CPC ..... *H04L 67/147* (2013.01); *H04N 21/23439* (2013.01); *H04N 21/8456* (2013.01)

(56) References Cited

U.S. PATENT DOCUMENTS

| | | | |
|---|---|---|---|
| 2016/0330500 | A1* | 11/2016 | Houdaille ........ H04N 21/23106 |
| 2016/0373546 | A1 | 12/2016 | Lotfallah et al. |
| 2018/0139254 | A1* | 5/2018 | Oyman ................. H04L 65/605 |
| 2018/0316740 | A1* | 11/2018 | Stockhammer ....... H04L 65/608 |

FOREIGN PATENT DOCUMENTS

| | | |
|---|---|---|
| CN | 106537813 A | 3/2017 |
| WO | 2015/104149 A1 | 7/2015 |
| WO | 2016/204815 A1 | 12/2016 |

OTHER PUBLICATIONS

3GPP TR 26.957, "3rd Generation Partnership Project; Technical Specification Group Services and System Aspects; Study on Server and Network-assisted Dynamic Adaptive Streaming Over HTTP (Dash) (SAND) for 3GPP multimedia services (Release 14)," Mar. 17, 2017, 52 pages.

Nokia et al., "Evaluation on the solutions for DASH optimization (Issue 3—case 2)," 3GPP Draft; R3-170565 DASH, 3rd Generation Partnership Project (3GPP), Feb. 12, 2017, 3pages.

Mockapetris, P., "Domain Names—Implementation and Specification", Network Working Group, Nov. 1987, 55 pages.

Fette, I. et al., "The WebSocket Protocol", Internet Engineering Task Force (IETF), ISSN: 2071-1721, Dec. 2011, 71 pages.

Study on Server and Network-assisted Dynamic Adaptive Streaming over HTTP (DASH) (SAND) for 3GPP multimedia services, 3rd Generation Partnership Project (3GPP), Mar. 2017, 3GPP TR 26.957, V14.1.0, Release 14, 52 pages.

"Transparent end-to-end Packet-switched Streaming Service (PSS); Progressive Download and Dynamic Adaptive Streaming over HTTP (3GP-DASH)", 3rd Generation Partnership Project (3GPP), Jun. 2016, 3GPP TS 26.247, V13.3.0, Release 13, 94 pages.

"Transparent end-to-end Packet-switched Streaming Service (PSS); General description", 3rd Generation Partnership Project (3GPP), Dec. 2015, 3GPP TS 26.233, V13.0.0, Release 13, 18 pages.

Information Technology—Dynamic adaptive streaming over HTTP (DASH), Part 5: Server and Network Assisted DASH (SAND), (2017), ISO/IEC 23009-5.

Information Technology—Dynamic adaptive streaming over HTTP (DASH), Part 1: Media presentation description and segment formats, (2019), ISO/IEC 23009-1.

Intel, "SAND Support in 3GPP DASH" 3rd Generation Partnership Project (3GPP), Apr. 2017, Busan, Korea, S4-170402, 33 pages.

Office Action from corresponding Chinese Application No. 201880048601.6 dated Nov. 17, 2021.

* cited by examiner

NETWORK ASSISTANCE IN DASH USING DNS

BACKGROUND

Field of the Disclosure

The present technique relates to a terminal device, data processing apparatuses and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In a network, for example a cellular or mobile network, in which a user terminal, which is a wireless handheld device like a smart phone, tablet or similar device, can access media streaming services, temporary bandwidth limitations to the terminal can make it difficult for the terminal to estimate the available bandwidth and cause media streaming buffer underflow in the terminal, leading to stalling of media playback and a dissatisfactory quality of experience for the user.

The 3GPP Feasibility Study on the usage of MPEG SAND in 3GPP services [5] describes a "Network Assistance" function which can be used to alleviate this problem. There remains, however, a need to further improve upon the solutions presented in this document.

SUMMARY

The present technique provides a terminal device for use with a telecommunications network, the terminal device comprising receiver circuitry, transmitter circuitry and processing circuitry, wherein the processing circuitry is configured: to control the receiver circuitry to receive data from infrastructure equipment of the network via a first communication path through the network; to control the transmitter circuitry to transmit, via a second, different, communication path through the network, a request to infrastructure equipment of the network requesting information identifying an element of the network configured to perform a predetermined process associated with the transmission of the data to the receiver circuitry; to control the receiver circuitry to receive, from infrastructure equipment of the network via the second communication path, a signal identifying the element of the network configured to perform the predetermined process associated with the transmission of the data to the receiver circuitry; and to monitor whether a predetermined condition associated with the reception of the data by the receiver circuitry is met and, when it is determined that the predetermined condition is met, to control the transmitter circuitry to transmit a request to infrastructure equipment of the network requesting the identified element of the network to perform the predetermined process associated with the transmission of the data to the receiver circuitry.

The present technique provides a terminal device for use with a telecommunications network, the terminal device comprising receiver circuitry, transmitter circuitry and processing circuitry, wherein the processing circuitry is configured: to control the receiver circuitry to receive data from infrastructure equipment of the network; to monitor whether a predetermined condition is met, the predetermined condition being met indicating that network assistance by an element of the network for supporting transmission of the data to the receiver circuitry is potentially required, and, when it is determined that the predetermined condition is met, to control the transmitter circuitry to transmit a request to infrastructure equipment of the network requesting that a data communication path be established between the element of the network for providing network assistance and the terminal device; to control the receiver circuitry to receive, from infrastructure equipment of the network, a signal indicating whether the request for a data communication path to be established between the element of the network for providing network assistance and the terminal device has been granted; and when it is indicated that the request for a data communication path to be established between the element of the network for providing network assistance and the terminal device has been accepted, to control the transmitter circuitry and/or receiver circuitry to establish a data communication path between the element of the network for providing network assistance and the terminal device.

The present technique provides a data processing device for use with a telecommunications network, the data processing device comprising processing circuitry and network interface circuitry, wherein the processing circuitry is configured: to control the network interface circuitry to receive, via a second communication path through the network, a request from a terminal device requesting information identifying an element of the network configured to perform a predetermined process associated with the transmission of data to the terminal device, the data being transmitted to the terminal device from infrastructure equipment of the network via a first, different, communication path through the network; based on the received request from the terminal device and information indicative of infrastructure equipment serving the terminal device, to determine the element of the network configured to perform the predetermined process associated with the transmission of the data to the terminal device; to control the network interface circuitry to transmit, via infrastructure equipment of the network and via the second communication path, a signal to the terminal device identifying the element of the network configured to perform the predetermined process associated with the transmission of the data to the terminal device.

The present technique provides a data processing device for providing network assistance for supporting transmission of data to a terminal device via infrastructure equipment of a telecommunications network, the data processing device comprising processing circuitry and network interface circuitry, wherein the processing circuitry is configured: to control the network interface circuitry to receive a request from the terminal device requesting that a data communication path be established between the data processing device and the terminal device, the terminal device transmitting the request when a predetermined condition is met, the predetermined condition being met indicating that network assistance by the data processing device for supporting transmission of data to the terminal device via infrastructure equipment of the network is potentially required; to determine whether the request that a data communication path be established between the data processing device and the terminal device should be granted and to control the network interface circuitry to transmit, via infrastructure equipment of the network, a signal to the terminal device indicating whether the request has been granted; and when the request has been granted, to control the network interface circuitry to establish a data communication path between the data processing device and the terminal device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
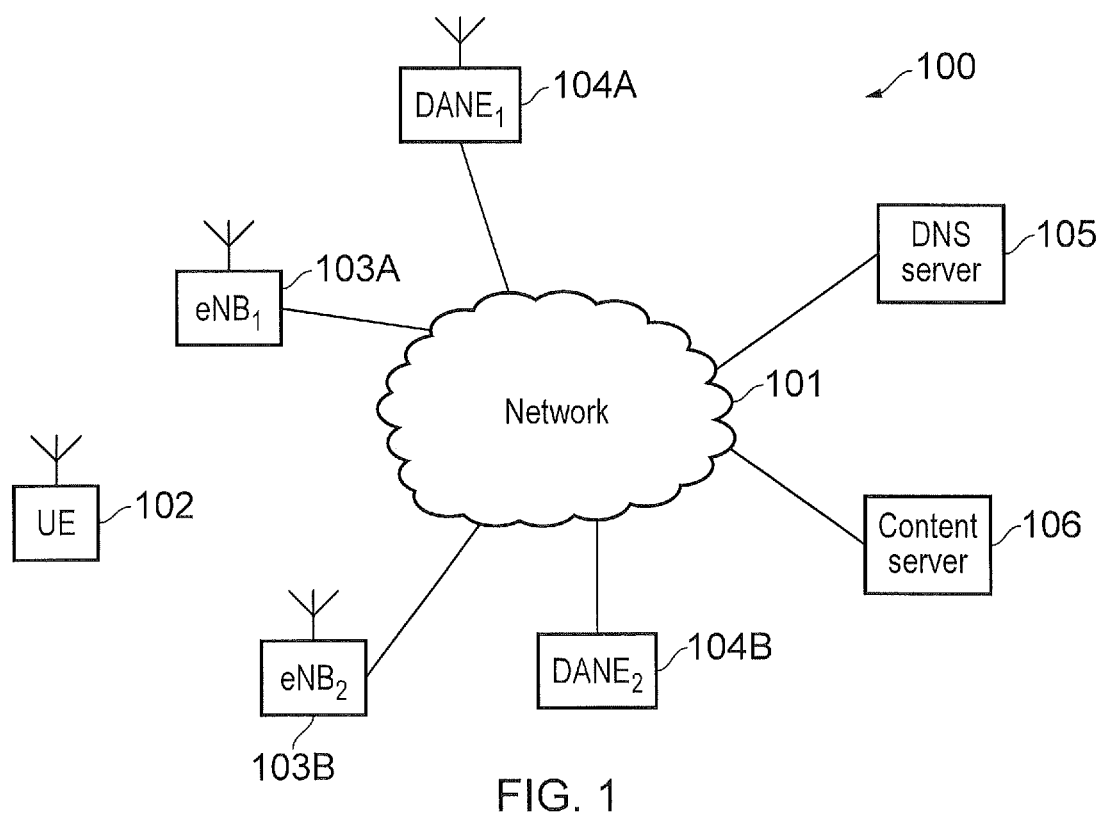
FIG. 1 schematically shows a system according to the present technique.

Referring now to the drawings, wherein like reference numerals designate identical or corresponding parts throughout the several views.

FIG. 1 schematically shows a system according to an embodiment. The system comprises a plurality of base stations 103A and 103B, a plurality of Dynamic Adaptive Streaming over Hypertext Transfer Protocol (HTTP) (DASH)—aware Network Elements (DANEs) 104A and 104B, a Domain Name System (DNS) server, a content server 106 and a terminal device 102 (also known as user equipment UE—this may be a wireless handheld device such as a smart phone, tablet or the like). Each of these elements is connected via a network 101, which is any suitable type of electronic communications network. In this example, the base stations 103A and 103B are $3^{rd}$ Generation Project Partnership (3GPP) Long Term Evolution (LTE) base stations and may be referred to as enhanced Node Bs (eNodeBs or eNBs) and the UE 102 communicates with the other elements of the network 101 via one of the base stations 103A or 103B using LTE technology. The other elements of the network may be connected to each other via any suitable wired and/or wireless networking technology. The network is such that data from one element connected to the element may be transmitted to another element connected to the network. LTE and, in general, the connection of different electronic elements over a network, are known in the art and will therefore not be discussed in detail here. Each of the elements connected to the network 101 (these may also be referred to as elements of the network 101) apart from the UE 102 may be referred to generally as infrastructure equipment.

Figure 2A:
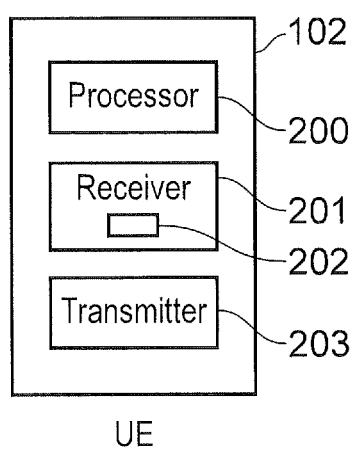
FIGS. 2A to 2C schematically show, in more detail, some of the elements of the system.
Figure 2B:
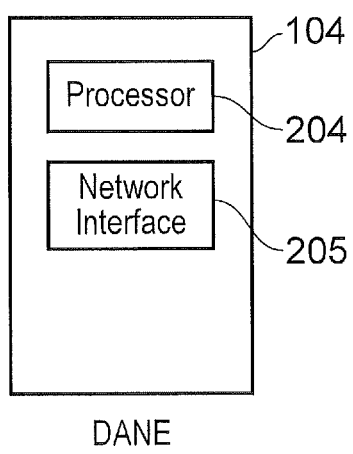
Figure 2C:
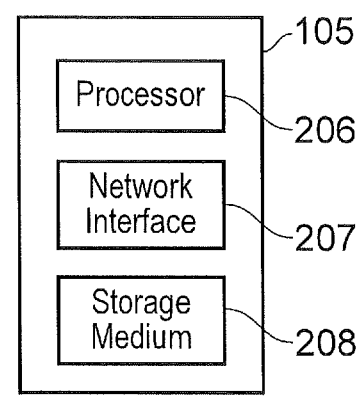

FIGS. 2A to 2C schematically show, in more detail, some of the elements connected to the network 101.

FIG. 2A schematically shows some components of a UE 102 according to an embodiment (both the specific examples of UE 102A and UE 102B may comprise such components). The UE 102 comprises a processor 200, a receiver 201 (comprising storage medium configured to act as a data buffer 202) and a transmitter 203. The transmitter 203 is for transmission of wireless signals, the receiver 201 is for reception of wireless signals and the processor 200 is configured to control the UE 102 to operate in accordance with embodiments of the present disclosure as described herein. The processor 200 may comprise various sub-units for providing functionality in accordance with embodiments of the present disclosure as explained further below. These sub-units may be implemented as discrete hardware elements or as appropriately configured functions of the processor 200. The processor 200 may be suitably configured/programmed to provide the desired functionality described herein using conventional programming/configuration techniques for equipment in telecommunications systems. The transmitter 203, receiver 201 and processor 200 are schematically shown in FIG. 2A as separate elements for ease of representation. However, it will be appreciated that the functionality of these elements can be provided in various different ways, for example using a single suitably programmed general purpose computer, or suitably configured application-specific integrated circuit(s)/circuitry. It will be appreciated that, although not shown, the UE 102 will in general comprise various other elements associated with its operating functionality, such as a display, user interface and the like.

FIG. 2B schematically shows some components of a DANE 104 according to an embodiment (both the specific examples of DANE 102A and DANE 102B may comprise such components). The DANE 104 comprises a processor 204 and a network interface 205. The network interface 205 is for transmission and reception of signals over the network 101 and the processor 204 is configured to control the DANE 104 to operate in accordance with embodiments of the present disclosure as described herein. The processor 204 may comprise various sub-units for providing functionality in accordance with embodiments of the present disclosure as explained further below. These sub-units may be implemented as discrete hardware elements or as appropriately configured functions of the processor 204. The processor 204 may be suitably configured/programmed to provide the desired functionality described herein using conventional programming/configuration techniques for equipment in telecommunications systems. The network interface 205 and processor 204 are schematically shown in FIG. 2B as separate elements for ease of representation. However, it will be appreciated that the functionality of these elements can be provided in various different ways, for example using a single suitably programmed general purpose computer, or suitably configured application-specific integrated circuit(s)/circuitry. It will be appreciated that, although not shown, the DANE 104 will in general comprise various other elements associated with its operating functionality.

FIG. 2C schematically shows some components of a DNS server 105 according to an embodiment. The DNS server 105 comprises a processor 206, a network interface 207 and a storage medium 208. The network interface 207 is for transmission and reception of signals over the network 101, the storage medium 208 is for storage of data (including, for example, information defining an association between base stations and DANEs of the network—see below) and the processor 206 is configured to control the DNS server 105 to operate in accordance with embodiments of the present disclosure as described herein. The processor 206 may comprise various sub-units for providing functionality in accordance with embodiments of the present disclosure as explained further below. These sub-units may be implemented as discrete hardware elements or as appropriately configured functions of the processor 206. The processor 206 may be suitably configured/programmed to provide the desired functionality described herein using conventional programming/configuration techniques for equipment in telecommunications systems. The network interface 207, processor 206 and storage medium 208 are schematically shown in FIG. 2C as separate elements for ease of representation. However, it will be appreciated that the functionality of these elements can be provided in various different ways, for example using a single suitably programmed general purpose computer, or suitably configured application-specific integrated circuit(s)/circuitry. It will be appreciated that, although not shown, the DNS server 105 will in general comprise various other elements associated with its operating functionality.

In embodiments, the present disclosure helps enhance the quality of experience of, for example, media streaming services when the service delivers content on a network where bandwidth varies over time, (for example, when the bandwidth is shared between several or many users), for example a wireless mobile or cellular network.

In one embodiment, the present technique enables realization of the Network Assistance (NA) function foreseen in the 3GPP feasibility study on "Server and Network Assisted DASH" [5], by applying and extending the MPEG DASH [3] and MPEG DASH SAND [2] technologies, as well as commonly used internet technologies like Domain Name System (DNS) [6].

Network Assistance is based on the model of the client requesting network assistance and a DANE responding to the request. The Network Assistance functionality may be granted to a client (for example, UE 102) supporting the delivery of 3GP-DASH content with either only the first or with both of the two functions below, in both cases based on the 3GP-DASH client having made a request to the DANE for Network Assistance:

The DANE indicates to the 3GP-DASH client the highest suitable media rate for the next segment download, based on the available Representations for the content item;

The DANE indicates to the 3GP-DASH client a temporary delivery boost for the next segment download, for occasions when the content playback input buffer on the client risks suffering from under-run.

Once a Network Assistance session is active, the client may issue a Network Assistance call prior to fetching the next media segment from the server. The Network Assistance call consists of a single logical signalling exchange. This exchange with the DANE activates either the first of the above functions or a sequence of both functions; the second only if the 3GP-DASH client was granted access to the function. If the client does not need a delivery boost, then the DANE omits the second function in the response to the 3GP-DASH client. A boost may increase the data rate.

Elements of the present disclosure include:

Discovery by the user terminal (terminal device 102) of the network element providing network assistance support (for example, DANE 104A or 104B).

Initiation and termination of the network assistance support session

Messages used between the user terminal and the network element providing network assistance support Application programming interface (API) for NA and DANE access in general on the user terminal The present technique improves on the state of the art of Network Assistance, thus helping to enhance the quality of experience of users of terminal devices 102 when streaming data (e.g. audio and/or video data or, more generally, media data) over a network.

In the further description:

The network element providing network assistance support is referred to as the DANE, meaning DASH-aware Network Element, the term adopted from the MPEG-DASH SAND specification [2];

The user terminal is referred to as the UE, meaning the User Equipment, the general term adopted in 3GPP specifications.

The present technique provides a terminal device 102 for use with a telecommunications network 101. The terminal device comprises receiver circuitry 202, transmitter circuitry 203 and processing circuitry 200.

The processor circuitry 200 is configured to control the receiver circuitry 201 to receive data from infrastructure equipment 103A or 103B of the network via a first communication path through the network. In one example, the data received from the infrastructure equipment 103A or 103B is audio and/or video content distributed from the content server 106 and the first communication path is a path from the content server 106 to the UE 102 via an appropriate one of the eNBs 103A or 103B (which one of these eNBs is used depends on which of the eNBs the UE 102 is connected to, for example).

The processor circuitry 200 is configured to control the transmitter circuitry 203 to transmit, via a second, different, communication path through the network, a request to infrastructure equipment of the network requesting information identifying an element of the network configured to perform a predetermined process associated with the transmission of the data to the receiver circuitry 201. In one example, the infrastructure equipment to which the request is sent is a data processing device such as the DNS server 105 and the element of the network configured to perform a predetermined process associated with the transmission of the data to the receiver circuitry 201 is one of the DANEs 104A or 104B. In one example, the predetermined process is network assistance. Each of the eNBs 103A and 103B is associated, respectively, with the DANE 104A and the DANE 104B (that is, each of the eNBs is associated with a different respective DANE). Thus, when the UE 102 is connected to the network 101 via eNB 103A, the predetermined process (for example, network assistance) is carried out by DANE 104A. On the other hand, when the UE 102 is connected to the network 101 via the eNB 104B, the predetermined process (for example, network assistance) is carried out by the DANE 104B. In this case, the second communication path is a path from the DNS server 105 to the UE 102 via an appropriate one of the eNBs 103A or 103B (which one of these eNBs is used depends on which of the eNBs the UE 102 is connected to, for example).

The processor circuitry 200 is configured to control the receiver circuitry 201 to receive, from infrastructure equipment of the network (for example, DNS server 105) via the second communication path, a signal identifying the element of the network configured to perform the predetermined process associated with the transmission of the data to the receiver circuitry 201. Thus, for example, the UE 102 may receive a signal identifying DANE 104A when it is connected to the network 101 via eNB 103A and a signal identifying DANE 104B when it is connected to the network 101 via eNB 103B. In this case, an association between eNB 103A and DANE 104A and between eNB 103B and DANE 104B is known to the infrastructure equipment which transmits the signal to the UE 102 over the network 101. This is possible, for example, because the request transmitted by the UE 102 comprises information from which the eNB to which the UE 102 is connected may be identified and the infrastructure equipment which receives the request via the second communication path has access to information indicative of the association between the UEs 103A and 103B and, respectively, the DANES 104A and 104B. In one example, when the infrastructure equipment which receives the request is the DNS server 105, the information indicative of the UE and DANE association is stored in the storage medium 208 (in a database or lookup table, for example). As one example the property identifying a DANE could be an IP-address.

The processing circuitry 200 is configured to monitor whether a predetermined condition associated with the reception of the data by the receiver circuitry 201 is met. When it is determined that the predetermined condition is met, the processing circuitry 200 is configured to control the transmitter circuitry 203 to transmit a request to infrastructure equipment of the network (such as the eNB 103A or 103B to which the UE 102 is connected and/or the DANE 104A or 104B associated with that eNB) requesting the identified element of the network (such as the appropriate DANE 104A or DANE 104B) to perform the predetermined process (such as network assistance) associated with the transmission of the data to the receiver circuitry 201.

The present technique provides a data processing device (such as DNS server 105) for use with the telecommunications network 101. The data processing device comprises processing circuitry 206 and network interface circuitry 207. The processing circuitry 206 is configured to control the network interface circuitry 207 to receive, via the second communication path through the network, the request from the terminal device 102 requesting information identifying an element of the network configured to perform a predetermined process associated with the transmission of data to the terminal device, the data being transmitted to the terminal device from infrastructure equipment of the network via the first, different, communication path through the network. Based on the received request from the terminal device and information indicative of infrastructure equipment serving the terminal device (for example, eNB 103A or 103B), the processing circuitry 206 is configured to determine the element of the network configured to perform the predetermined process associated with the transmission of the data to the terminal device. The processing circuitry 206 is configured to control the network interface circuitry 207 to transmit, via infrastructure equipment of the network and via the second communication path, the signal to the terminal device 102 identifying the element of the network (for example, DANE 104A or 104B) configured to perform the predetermined process associated with the transmission of the data to the terminal device.

Further to the above general explanation, a particular embodiment of the present technique is now described.

The MPEG (Motion Picture Experts Group) SAND (Server and Network-assisted DASH) specification suggests methods for publication of the location of a DANE 104, including its inclusion in the MPD (media presentation description) of the content item (when the data transmitted to the UE 102 is media data such as audio and/or video data), by using the "SAND:Channel" element. This is, however, not preferable for network assistance according to the present disclosure because the network assistance DANE is out-of-band of the media delivery path. With the present technique, as previously described, communications with the DANE occur in a separate path (second communication path rather than the first communication path), thus allowing the media delivery server (content server 106) to be independent of issues relating to network configuration and provisioning. The present technique is applicable to a cellular mobile network. The DANE may therefore be provided at various locations in the network and the terminal needs to use a DANE at their particular location (that is, a DANE usable with the eNB currently serving the UE 102).

In an embodiment, the second communication path for DANE discovery is implemented using Domain Name System (DNS) [6].

In the computing field, networks commonly use DNS to enable the use of various Internet-based facilities. The present disclosure makes further use of DNS to enable the user terminal 102 to discover the network element (for example, DANE 104A or 104B) providing network assistance support to that terminal (UE).

The network DNS server 105 receives the DNS query from the UE, which specifically requests the address or location of the network element (DANE).

Since the configuration of the network, for example, a mobile network operator's network, is not known in advance, a mechanism is defined whereby a generic query can be used by any UE 102 at any location to discover an appropriate DANE. The DNS server 105 in the network is pre-configured or is able to determine the location or address of the DANE that is best able to serve the UE request for network assistance. For example, the storage medium 208 stores information indicative of a relationship (in the form of a database or lookup table or the like) between each base station in the network and the DANE to be used for that base station, as previously described.

In an embodiment, the UE uses a Partially-Qualified Domain Name (PQDN) in the query to the DNS server. In other embodiments, the UE uses a Fully-Qualified Domain Name (FQDN) in the query to the DNS server.

In an embodiment, the domain naming strategy used in the present disclosure enables the flexible deployment of SAND and the various modes of DANE that can be implemented.

A sub-domain "dane" is defined to be the PQDN where all DANEs are grouped logically. One or more DANEs that the network implements and provides for use by UEs in that network can be accommodated under that sub-domain. In response to a DNS query on the sub-domain "dane", the DNS server 105 returns the list of DANEs provided in the network. If only a single generic DANE is provided then the response provides an IP address where the generic DANE is reached. Specific modes of DANE are identified as each being a sub-domain of the "dane" sub-domain. Thus an NA-DANE is located at the PQDN "na.dane", and a proxy-caching DANE is located at the PQDN "pq.dane". If a specific mode of DANE is queried, then the response informs of the IP address of that mode of DANE. If multiple modes of DANE are implemented in the network, then a DNS query to the PQDN "dane" results in a response containing all DANEs that are provided in the network, that is, concatenated response records with IP addresses for "na.dane", "pq.dane", etc.

Alternatively, there could be specific unique PQDNs defined to for each mode of DANE "na-dane", "nara-dane", or a similar pre-defined string of characters, to refer to the function of network assistance DANE. It can be specifically noted that it is necessary to differentiate between different types of DANE because different modes of operation of a DANE may be defined and provided (that is, a DANE is not used just for Network Assistance but may also have other functions or additional functions).

PQDNs should also be defined for other possible DANE modes, for example proxy caching (for example, "pq-dane") and more generic QoE/QoS management (for example, "qoe-dane"). It will be appreciated that the idea of the present disclosure may be combined with one of these or other DANE modes.

With the well-known pre-defined PQDN, any terminal device 102 can discover the IP address of the network assistance DANE (for example, DANE 104A or 104B) by issuing a DNS query to the known DNS server 105 in the network. Hence, the DNS function allows for directing the UE 102 to contact a specific appropriate DANE that provides support for the required DANE mode, depending on the PQDN used, if multiple DANEs with different assistance functions are available within the same network.

In addition to the generic method of discovering a DANE via DNS query with a PQDN, it may be desirable in some cases that a network operator who supplies UEs, or for some other reason, that the UEs are pre-configured with one or more FQDNs to locate the required DANE(s). Using an FQDN (Fully Qualified Domain Name) means that the DANE location(s) will always be the same, at least in the network of the network operator that supplies or otherwise controls the provision of the UE 102.

In the following description the network assistance DANE may be referred to as the NA-DANE.

The terminal device 102 may be moving around and thus change mobile cell or base station registration (for example, the terminal device 102 may move from being served by eNB 103A to being served by eNB 103B). When this happens, it is possible that a different NA-DANE is responsible for providing the network assistance functionality. The UE can recognise this by the usual handover/roaming procedures between mobile cells or base stations, and re-issue the DNS query to discover the IP address of the appropriate NA-DANE in the new network location. The roaming handover can also include a notification of the new NA-DANE address, if applicable, thus saving the UE from having to actively re-discover the NA-DANE itself. It is also possible that the same NA-DANE is responsible for network assistance in the new mobile cell.

In embodiments, the present technique also provides a terminal device 102 for use with a telecommunications network 101, the terminal device 102 comprising receiver circuitry 201, transmitter circuitry 203 and processing circuitry 200.

The processing circuitry 200 is configured to control the receiver circuitry 201 to receive data from infrastructure equipment (such as the content server 106) of the network.

The processing circuitry 200 is configured to monitor whether a predetermined condition is met, the predetermined condition being met indicating that network assistance by an element of the network (this being a data processing device such as DANE 104A or 104B, for example) for supporting transmission of the data to the receiver circuitry 201 is potentially required. When it is determined that the predetermined condition is met, the processing circuitry 200 is configured to control the transmitter circuitry 203 to transmit a request to infrastructure equipment of the network (such as DANE 104A or 104B) requesting that a data communication path be established between the element of the network for providing network assistance and the terminal device 102.

The processing circuitry 200 is configured to control the receiver circuitry 201 to receive, from infrastructure equipment of the network (such as DANE 104A or 104B), a signal indicating whether the request for a data communication path to be established between the element of the network for providing network assistance (such as DANE 104A or 104B) and the terminal device 102 has been granted. When it is indicated that the request for a data communication path to be established between the element of the network for providing network assistance and the terminal device 102 has been granted, the processing circuitry 200 is configured to control the transmitter circuitry 203 and/or receiver circuitry 201 to establish a data communication path between the element of the network for providing network assistance and the terminal device 102.

In an embodiment, when a data communication path between the element of the network for providing network assistance (such as DANE 104A or 104B) and the terminal device 102 has been established, the processing circuitry 200 is configured to monitor whether a further predetermined condition is met, the further predetermined condition being met indicating that network assistance by an element of the network for supporting transmission of the data to the receiver circuitry 201 is no longer potentially required. When it is determined that the further predetermined condition is met, the processing circuitry 200 is configured to control the transmitter circuitry 203 to transmit a request to infrastructure equipment of the network (such as DANE 104A or 104B) requesting that the data communication path between the element of the network for providing network assistance and the terminal device be disconnected. The processing circuitry 200 is configured to control the receiver circuitry 201 to receive, from infrastructure equipment of the network (such as DANE 104A or 104B), a signal indicating whether the request for the data communication path to be disconnected has been granted. When it is indicated that the request for the data communication path to be disconnected has been accepted, the processing circuitry 200 is configured to control the transmitter circuitry 203 and/or receiver circuitry 201 to disconnect the data communication path between the element of the network for providing network assistance and the terminal device 102.

In an embodiment, the data received from the infrastructure equipment (such as the content server 106) is audio and/or video data. In this case, the predetermined condition for establishment of the data communication path comprises, for example, one or more of the terminal device being in a mode such the processing circuitry 200 is configured to control the transmitter and receiver circuitry to send and receive signals, an application which enables audio and/or video data to be viewed being executed by the processing circuitry 200, and a command to view particular audio and/or video data being executed by the processing circuitry 200. Furthermore, the further predetermined condition for disconnection of the data communication path comprises, for example, one or more of execution by the processing circuitry 200 of a command to view particular audio and/or video data being stopped, execution by the processing circuitry 200 of an application which enables audio and/or video data to be viewed being stopped, and the terminal device being in a mode such the processing circuitry 200 is configured to control the transmitter and receiver circuitry not to send and receive signals.

In an embodiment, when a data communication path between the element of the network for providing network assistance (such as DANE 104A or 104B) and the terminal device 102 has been established, the processing circuitry 200 is configured to control the transmitter circuitry 203 to transmit, via the established data communication path, a request to the element of the network for providing network assistance requesting information identifying an estimated and recommended highest rate from a predetermined plurality of rates available at the terminal device at which the data may be transmitted to the receiver circuitry 201 by the infrastructure equipment of the network (such as the content server 106). When the data is audio and/or video data, for example, each of the predetermined plurality of rates may relate to a different respective representation of the audio and/or video data, ranging from higher quality (with a higher required data transmission rate) to lower quality (with a lower required data transmission rate). The processing circuitry 200 is configured to control the receiver circuitry 201 to receive, from the element of the network for providing network assistance via the established communication path, a signal indicating the identified estimated and recommended highest rate at which the data may be transmitted to the receiver circuitry 201 by the infrastructure equipment of the network. The processing circuitry 200 is configured to control the receiver circuitry 201 to receive the data from the infrastructure equipment at a rate based on the indicated estimated and recommended highest data rate.

In an embodiment, when a data communication path between the element of the network for providing network assistance (such as DANE 104A or 104B) and the terminal device 102 has been established, the processing circuitry 200 is configured to monitor whether a data boost predetermined condition is met, the data boost predetermined condition being met indicating that additional communication resources (such as time and/or frequency radio resources in an LTE radio frame) are required for transmission of the data from the infrastructure equipment of the network (such as the content server 106) to the receiver circuitry 201. When it is determined that the data boost predetermined condition is met, the processor circuitry 200 is configured to control the transmitter circuitry 203 to transmit, via the established data communication path, a request to the element of the network for providing network assistance requesting additional communication resources to be made available for transmission of the data from the infrastructure equipment to the receiver circuitry 201. The processing circuitry 200 is configured to control the receiver circuitry 201 to receive, from the element of the network for providing network assistance via the established data communication path, a signal indicating whether the request for additional network resources to be made available has been granted. When it is indicated that the request for additional communication resources to be made available has been granted, the processing circuitry 200 is configured to control the receiver circuitry 201 to receive the data from the infrastructure equipment using the additional communication resources.

In an embodiment, the data buffer 202 of the terminal device 102 is configured to temporarily store data received from the infrastructure equipment (such as the content server 106) of the network and the data boost predetermined condition comprises the data buffer storing less than a predetermined amount of data. Such an arrangement means that network assistance is sought by the terminal device 102 when, due to the data buffer storing less than the predetermined amount of data, there is a risk of buffer underrun (and thus an unsatisfactory user experience, especially in the case of the received data being video and/or audio data). The risk of buffer underrun is therefore reduced, therefore improving the user experience. In an embodiment, the data boost predetermined condition comprises an estimation of the remaining time until the data buffer 202 is expected to be empty, that is, a remaining media playback time corresponding to the data stored in the buffer 202.

In an embodiment, one or more messages transmitted from the terminal device 102 to infrastructure equipment of the network (including, for example, the request transmitted to infrastructure equipment of the network requesting that a data communication path be established between the element of the network for providing network assistance and the terminal device, the request transmitted to infrastructure equipment of the network requesting that a data communication path between the element of the network for providing network assistance and the terminal device be disconnected, the request transmitted to the element of the network for providing network assistance requesting information identifying the estimated and recommended highest rate at which the data may be transmitted to the receiver circuitry by infrastructure equipment of the network, and the request transmitted to the element of the network for providing network assistance requesting additional communication resources to be made available for transmission of the data from the infrastructure equipment to the receiver circuitry) may be provided with one or more Server and Network-assisted Dynamic Adaptive Streaming over Hypertext Transfer Protocol (HTTP) (DASH) (SAND) messages. In one example, such a SAND message may a SAND message comprising an extension comprising the request. The extension of the SAND message may be comprised within the 3GPP namespace. In another example, the request is provided with the SAND message in the SAND message envelope.

The present technique provides a data processing device (such as DANE 104A or 104B) for providing the network assistance for supporting transmission of data to the terminal device 102 via infrastructure equipment (such as content server 106) of the telecommunications network 101. The data processing device comprises processing circuitry 204 and network interface circuitry 205. The processing circuitry 204 is configured to control the network interface circuitry 205 to receive the request from the terminal device 102 requesting that a data communication path be established between the data processing device and the terminal device, the terminal device 102 transmitting the request when a predetermined condition is met, the predetermined condition being met indicating that network assistance by the data processing device for supporting transmission of data to the terminal device via infrastructure equipment of the network is potentially required. The processing circuitry 204 is configured to determine whether the request that a data communication path be established between the data processing device and the terminal device 102 should be granted and to control the network interface circuitry 205 to transmit, via infrastructure equipment of the network (such as eNB 103A or 103B), the signal to the terminal device indicating whether the request has been granted. When the request has been granted, the processing circuitry 204 is configured to control the network interface circuitry 205 to establish the data communication path between the data processing device and the terminal device 102.

Further to the above general explanation, a particular embodiment of the present technique is now described.

Initiation and Termination of the Network Assistance Support Session

Once the UE 102 has obtained the IP address of the NA-DANE (for example, DANE 104A or 104B), it may communicate with it for the purpose of accessing the network assistance functions it provides.

The first step of communications involves the registration of the UE to the NA-DANE, equivalent to notifying the NA-DANE that the UE may request NA facilities, at any time in the future while the UE is operational, and/or in the process of receiving data (for example, streamed media). This process is the initiation of an NA session with the NA-DANE.

An NA session is valid, for example, for all media streaming activities that might be operating concurrently in the UE, or a separate NA session could be initiated for each streaming media application, or content item being received, at any time. Users or UEs may be offered different versions of the same application for download, a version supporting an NA session and a version which doesn't or that is more restrictive in its ability to make use of Network Assistance (for example, a "premium" version with NA with higher cost or that shares more user data than a "standard" version without or with reduced NA functionality). In embodiments, an application may support NA, but initiation of an NA session may be blocked dependent upon the nature of a user/UE's subscription with a carrier or network operator. It may only be available to premium subscribers. A subscriber database may be interrogated before an NA session is initiated.

In an example, the scope of the NA session depends on the application being run to receive streaming media. For an application whose primary purpose is to receive streaming media content, the scope of the NA session may be from the launch of that application until it is terminated, for example. For an application whose primary purpose is something other than to receive streaming media content (for example, a news site that provides media streaming content to complement news items), then the scope of the NA session may be, for example, from the launch of playback of a content item until it is stopped, or for the duration of an automated playback reel by the application. An NA session may be prolonged if a user continues to interact with the page (for example, a news or other page with multiple video items inserted between text items or advertisements; the video items may be advertisements) for example by scrolling through the page or performing other actions that prevent a screen lock or screen power down or power use mode change from being initiated. Screen lock, power mode change or the like could initiate termination of the NA session.

The UE initiates an NA session by sending an appropriate request message to the NA-DANE, as previously described. Thus, in other words, the above-identified scope of the NA session is initiated by a predetermined criterion that can depend on the application being run to receive the streaming media. For this purpose a new MPEG SAND message can be defined, or a 3GPP-specific SAND message can be defined.

When the UE no longer requires NA facilities, it terminates the NA session. This may be the case, for example, when the UE enters an inactive state on the network (for example, "flight mode" in which the receiver 201 and transmitter 203 do not receive or transmit signals), when all media streaming activity is terminated, or when the playback of a streamed media content item is stopped.

The UE terminates a network assistance session by sending an appropriate request message to the NA-DANE, as previously explained. Also for this purpose a new MPEG SAND message can be defined, or a 3GPP-specific SAND message can be defined. These messages are described below.

Communications Between the Terminal and Network Assistance Server

The MPEG SAND specification provides several options for the communication method between the client (UE 102) and the server (DANE 104A or 104B). In one example of the present technique, WebSocket communication is used, since this allows more efficient and flexible bi-directional communication between the UE and the NA-DANE, which is out-of-band with respect to the media stream delivery.

If the use of WebSocket is not feasible for any reason then, in another example, HTTP POST for the transfer of SAND messages is used. The UE knows the DANE IP address from the discovery process, so HTTP POST is used to carry NA messages between the UE and DANE.

Messages Used Between the User Terminal and the Network Element Providing Network Assistance Support General The Network Assistance function enables a media streaming client, for example one supporting the 3GP-DASH system [3], to improve the Quality of Service (QoE) of content streaming sessions, and is provided by the DANE. The NA-DANE is out-of-band, that is, it is not in the media delivery path. The NA communication is independent from the media server (such as content server 106) communication, hence the NA communication occurs in a separate path to the transfer of the MPD and the content segments. The media server does not need to be aware of the NA function.

NA may be made available to certain clients only, for example subject to subscription options. Client authentication may also be applied before granting access to NA facilities. Clients are able to discover the availability and information about the NA-DANE, and to establish an NA session with the NA-DANE.

An example method for NA session initiation and termination is described below. Example NA request and response compound messages and each of the component messages are also described below.

In an example, the new messages are defined in the 3GPP namespace, since the SAND specification requires that HTTP header carriage of SAND messages is a required capability, whereas this is not a feasible method of carriage for NA, since the communication to the DANE is out-of-band with respect to media delivery.

In an example, the new messages are defined in the SAND specification, on the condition that HTTP header carriage was not a requirement for the NA messages.

In an example, the XML format is used for the message element when HTTP header carriage of NA messages is not used. Hence numerical messageType values for the new SAND messages are not defined, but could be if deemed necessary.

NA Session Initiation and Termination

Messages are hereby defined to enable the UE to initiate and terminate an NA session with the NA-DANE (that is, to establish a data communication path with a discovered NA-DANE).

Generic Message Structure:

| Function call | Originator → destination | Parameters |
|---|---|---|
| Network Assistance session initiation request | UE → DANE | |
| Network Assistance session initiation response | DANE → UE | session id |

-continued

| Function call | Originator → destination | Parameters |
|---|---|---|
| Network Assistance session terminiation request | UE → DANE | session id |
| Network Assistance session terminiation response | DANE → UE | session id |

In an example, the same message container can be used for both request and response in both cases, whereby request and response in each case can differ in the permitted use of parameters.

NA Session Initiation Message Syntax:

| SandMessage = NetworkAssistanceInitiation | Object | 1 | |
|---|---|---|---|
| SessionID | Integer | 0 . . . 1 | Reference to the network assistance session, allocated by the DANE. A value of 0 is reserved to indicate failure, or refusal of the NA session initiation. This parameter is not present in the request message. |

NA Session Termination Message Syntax:

| SandMessage = NetworkAssistanceTermination | Object | 1 | |
|---|---|---|---|
| SessionID | Integer | 1 | Reference to the network assistance session that was allocated by the DANE after successful initiation. The request message shall not use value 0 for SessionID, since it is an invalid setting. A response message indicating SessionID = 0 means that an unknown SessionID was provided in the request, or some other failure. |

It is also possible to define separate request and response messages in each case.

NA Request Message

NA is based on the model of the client requesting network assistance and the NA-DANE responding to the request. The NA functionality may be granted to a client with either only the first or with both of the two functions below, in both cases based on the UE client having made a request to the DANE for Network Assistance:

The DANE indicates to the client the highest suitable media rate for the next segment download, based on the available Representations for the content item;

The DANE indicates to the client a temporary delivery boost for the next segment download, for occasions when the content playback input buffer on the client (for example, data buffer 202) risks suffering from under-run.

Once a NA session is active, the UE client 102 may issue a NA call prior to fetching the next media segment from the media server. The Network Assistance call consists of a single logical signalling exchange. This exchange with the DANE activates either the first of the above functions or a sequence of both functions; the second only if the client was granted access to the delivery boost function. If the client does not need a delivery boost, then the DANE omits the second function in the response to the UE client.

The MPEG SAND specification provides a set of messages that can be used to facilitate the NA function. However, some necessary facilities are missing, namely for NA session initiation and termination, an efficient method to communicate the segment duration, for the network boost request from the UE to the DANE, and the network boost response from the DANE to the UE. Thus, example message types of the present disclosure are defined below.

The Network Assistance functions depend on only a small part of the set of existing SAND capabilities.

The generic procedure for the Network Assistance request is:

Network Assistance Request Generic Procedure

| Function call | Originator → destination | Parameters |
|---|---|---|
| Network Assistance request | UE → DANE | Segment duration Available bitrates Boost requested flag Buffer level |

The Network Assistance request is realised by using a single SAND message envelope containing SAND messages and new messages defined in the present disclosure. An example definition and syntax of the new messages is defined below:

Provision of Information about the Content Item

Once the UE has established a network assistance session the UE may provide video content information such as a selection of the information available in the media presentation description (MPD) or content manifest to the (out-of-band) DANE.

The existing SAND message SharedResourceAllocation is used to convey the information on the available bitrates.

The Network Assistance request (NA request) is realised by using a single SAND message envelope containing the SAND messages SharedResourceAllocation and optionally BufferLevel. An example syntax of this part of the Network Assistance request is shown within the example of a complete NA request described below.

The senderId element of the SAND message envelope may be used by the UE as a reference for the Network Assistance transaction.

The generationTime element of the SAND message envelope is not required for Network Assistance, hence it may be omitted.

The common SAND message element messageId is not used and may be omitted in all Network Assistance messages.

The segment duration and available media bitrates are derived by the client from the information contained in the MPD.

The common SAND message element validityTime in the SharedResourceAllocation SAND message may contain the media segment duration. Alternatively, if a more efficient carriage is preferred, the new message type "segment duration" as defined below is used for this purpose.

The parameters operation Points and bandwidth in the SAND message SharedResourceAllocation shall represent each of the available media bitrates, indicated as the sum of all media components.

The buffer level component message may be omitted, but if the client is requesting a boost for this segment then the buffer level shall be communicated.

| SandMessage = | BufferLevel | Object | 1 | |
|---|---|---|---|---|
| T | | Real-Time | 1 | Time of the measurement of the buffer level. |
| Level | | Integer | 1 | Level of the buffer in milliseconds. Indicates the playout duration for which media data of all active media components is available starting from the current playout time. |

Provision of Information on UE Status

As well as information about the content item, the UE may also provide information about its status, for example, local buffer status information to the NA-DANE. This includes the minimum and maximum target buffer fullness level, and the current fullness level of the media playback buffer. The last parameter is the same as in the BufferLevel message above.

| SandMessage = UEBufferInformation | Object | 1 | |
|---|---|---|---|
| minimumTargetBufferLevel | Integer | 1 | UE-preferred minimum buffer level in milliseconds |
| maximumTargetBufferLevel | Integer | 1 | UE-preferred maximum buffer level in milliseconds |
| currentBufferLevel | Integer | 1 | Current buffer level in milliseconds |

A message is defined to communicate the segment duration in the selected content item. The segment duration may be inherent and nominal, that is, it is not intended to be a specifically accurate measure of each segment's duration, rather a nominal close approximation to the segment duration, as indicated in the content item manifest, or media presentation description. The duration value is an integer of milliseconds but, again, usually the segment duration is a nominal value that need not match accurately the actual duration of any segment. A value in milliseconds provides simplicity in syntax combined with flexibility with the choice of segment duration by the content provider or delivery network. Usually the duration is quoted as a number of seconds, but a figure in milliseconds is used in case there may be content that benefits from shorter segment durations (for example, less than one second).

Segment Duration Provision Generic Procedure

| Function call | Originator → destination | Parameters |
|---|---|---|
| Segment duration | UE → DANE | Segment duration in milliseconds |

Segment Duration Message Syntax:

| SandMessage = | Object | 1 | |
|---|---|---|---|
| SegmentDuration | | | |
| segmentDuration | Integer | 1 | Segment duration in milliseconds |

Network Delivery Boost Request and Response

In case the buffer level in the UE is low, there could be a specific benefit for the UE to request higher data delivery priority from the network. This is denoted as a network delivery boost and is, for example, implemented by providing more communication resources for transmission of data to the UE.

Example messages are hereby defined to enable the UE to signal a request to the NA-DANE for a boost of streaming throughput during the next segment delivery, and for the NA-DANE to respond to such a request, either confirming or declining the boost request.

Generic Message Structure:

Delivery Boost Request and Response Generic Procedure

| Function call | Originator → destination | Parameters |
|---|---|---|
| Delivery boost request | UE → DANE | |
| Delivery boost response | DANE → UE | Request granted or not |

The delivery boost request is activated by the inclusion of the message in the SAND message envelope. In an example, it has no additional parameters. If it is present then the delivery boost request is actuated. If it is not present then the UE is not making a delivery boost request for the respective segment.

The response may be embodied in various ways. In an example, the response contains the parameter string or tag "granted" or "declined". A variant on this is to define two distinct messages to signal "boostGranted" or "boostDeclined". Another possibility is to define a boolean variable for "granted"=TRUE and "declined"=FALSE, or binary values 1 and 0 respectively. A further possible embodiment is to use the same message type in both directions, for example called "DeliveryBoost", whereby when the UE sends this message to the DANE there is no additional parameter, but for the reply from the DANE to the UE the parameter signifying "granted" or "declined" or similar is included.

If a requested delivery boost is not granted, the UE may, for example, choose a lower bitrate segment in order to reduce the risk of buffer underflow occurring in the next segment.

DeliveryBoost Message Syntax:

| SandMessage = | Object | 1 | |
|---|---|---|---|
| DeliveryBoost | | | |
| Status | enum | 1 | Status of requested delivery boost |

The Status Semantics are:

| Status | Semantics |
|---|---|
| boostGranted | Delivery boost granted |
| boostDeclined | Delivery boost declined |

Example NA Request and Response Messages

As described above, in an example, a SAND message envelope is used to carry several SAND messages in order to facilitate the NA request and response messages. The component messages within the SAND message envelope can consist of a combination of existing SAND messages known from the SAND specification [ISO/IE023009-5] and new messages, whether added subsequently to the SAND specification or defined in a 3GPP or other specification.

The example NA request message consists of a SAND envelope that contains the component messages segment duration, available bitrates, delivery boost request, and buffer level.

Example NA Request Message:

| Parameter | Type | Cardinality | Description |
|---|---|---|---|
| CommonEnvelope | | 1 | |
| senderId | Token | 0 . . . 1 | If present, this is a unique identifier of the message sender. It is up to the sender to provide such a unique identifier. |
| SandMessage = | Object | 1 | |
| SegmentDuration | | | |
| segmentDuration | integer | 1 | Segment duration in milliseconds |

-continued

| Parameter | Type | Cardinality | Description |
|---|---|---|---|
| SandMessage = SharedResourceAllocation | Object | 1 | |
| operationPoints | array | 1 ... N | List of currently available operation points. |
| bandwidth | integer | 1 | A bandwidth value expressed in a number of bits per second, for each operationPoint listed. This value should be computed from the MPD by summing bandwidths of all components the client would use for working at this operation point. |
| SandMessage = DeliveryBoost | Object | 1 | |
| SandMessage = BufferLevel | Object | 1 | |
| T | Real-Time | 1 | Time of the measurement of the buffer level. |
| Level | Integer | 1 | Level of the buffer in milliseconds. Indicates the playout duration for which media data of all active media components is available starting from the current playout time. |

The example NA response message consists of a SAND envelope that contains the component messages recommended bitrate, and delivery boost response.

Example NA Response Message:

| Parameter | Type | Cardinality | Description |
|---|---|---|---|
| CommonEnvelope | | 1 | |
| SandMessage = SharedResourceAssignment | Object | 1 | |
| validityTime | date-time | 0 ... 1 | If present, this indicates the duration of validity o the response expressed in UTC time. |
| Bandwidth | Int | 1 | This field contains the recommended highest bandwidth from those available as indicated in the Network Assistance request. The unit is defined in bits per second. |
| SandMessage = DeliveryBoost | Object | 1 | |
| Status | Enum | 1 | Status of requested delivery boost. |

SAND XML Schema Extension

In an example, the definition of the new messages is as messages that are specific to 3GPP, that is, they are defined within the 3GPP realm of specifications and hence also within 3GPP's XML namespace, meaning that the 3GPP organization has complete responsibility and control over their definition and their potential further extension.

The new messages defined in the present disclosure are inserted into the SAND XML schema for SANDEnvelope-Type as additional elements in the message type choice enumeration. In an example, their listing in the XML is as follows:

```
<!-- 3GPPSANDMessage Types -->
<xs:element name="NetworkAssistanceInitiation" type="NetworkAssistanceInitiationType"/>
<xs:element name="NetworkAssistanceTermination" type="NetworkAssistanceTerminationType"/>
<xs:element name="SegmentDuration" type="SegmentDurationType"/>
<xs:element name="DeliveryBoost" type="DeliveryBoostType"/>
```

An example 3GPP schema extension for SAND is proposed as shown in the following table. This is representative of the features disclosed, which may equally well be accommodated in an equivalent XML schema even if it might have some syntax aspects differing from this proposed schema.

```xml
<?xml version="1.0" encoding="UTF-8"?>
<xs:schema
    targetNamespace="urn:3gpp:dash:schema:sandmessageextension:2017"
    attributeFormDefault="unqualified"
    elementFormDefault="qualified"
    xmlns:xs="http://www.w3.org/2001/XMLSchema"
    xmlns="urn:3gpp:dash:schema:sandmessageextension:2017">
    <xs:annotation>
        <xs:appinfo>SAND Messages Extension</xs:appinfo>
        <xs:documentation xml:lang="en">
            This Schema defines the Server And Network Assisted DASH (SAND) messages extension for
3GPP.
        </xs:documentation>
    </xs:annotation>
    <!-- SAND message: main element -->
    <xs:element name="SANDMessage" type="SANDEnvelopeType"/>
    <!-- SAND common envelope Type -->
    <xs:complexType name="SANDEnvelopeType">
        <xs:choice maxOccurs="unbounded">
            <xs:element name="NetworkAssistanceInitiation" type="NetworkAssistanceInitiationType"/>
            <xs:element name="NetworkAssistanceTermination" type="NetworkAssistanceTerminationType"/>
            <xs:element name="SegmentDuration" type="SegmentDurationType"/>
            <xs:element name="DeliveryBoost" type="DeliveryBoostType"/>
            <xs:any namespace="##other" processContents="lax" minOccurs="0" maxOccurs="unbounded"/>
        </xs:choice>
        <xs:attribute name="senderId" type="xs:token"/>
        <xs:attribute name="generationTime" type="xs:dateTime"/>
        <xs:anyAttribute namespace="##other" processContents="lax"/>
    </xs:complexType>
    <!-- SAND message base Type -->
    <xs:complexType name="SANDMessageType">
        <xs:attribute name="messageId" type="xs:unsignedInt"/>
        <xs:attribute name="validityTime" type="xs:dateTime"/>
    </xs:complexType>
    <!-- NetworkAssistanceInitiation Type -->
    <xs:complexType name="NetworkAssistanceInitiationType">
        <xs:attribute name="sessionId" type="xs:unsignedInt" minOccurs="0" maxOccurs="1"/>
    </xs:complexType>
    <!-- NetworkAssistanceTermination Type -->
    <xs:complexType name="NetworkAssistanceTerminationType">
        <xs:attribute name="sessionId" type="xs:unsignedInt" use="required"/>
    </xs:complexType>
    <!-- SegmentDuration Type -->
    <xs:complexType name="SegmentDurationType">
        <xs:attribute name="duration" type="xs:unsignedInt" use="required"/>
    </xs:complexType>
    <!-- DeliveryBoost Type -->
    <xs:complexType name="DeliveryBoostType">
        <xs:attribute name="DeliveryBoostStatus" type="DeliveryBoostStatusType" use="required"/>
    </xs:complexType>
    <!-- DeliveryBoostStatus Type -->
    <xs:simpleType name="DeliveryBoostStatusType">
        <xs:restriction base="xs:string">
            <xs:enumeration value="granted"/>
            <xs:enumeration value="declined"/>
        </xs:restriction>
    </xs:simpleType>
</xs:schema>
```

In general, with the present technique, an Application Programming Interface (API) may be defined in order to make it easier for applications on the UE that access media streams from the network to access NA functionality. When such an API is used, during an initialising period, the UE discovers the DANE and/or the mode of DANE requested by the calling application. The UE then initiates an NA or other session as appropriate with the DANE.

FIGS. 3A to 3B and 4A to 4B show flow charts illustrating example processes according to the present technique.

Figure 3A:
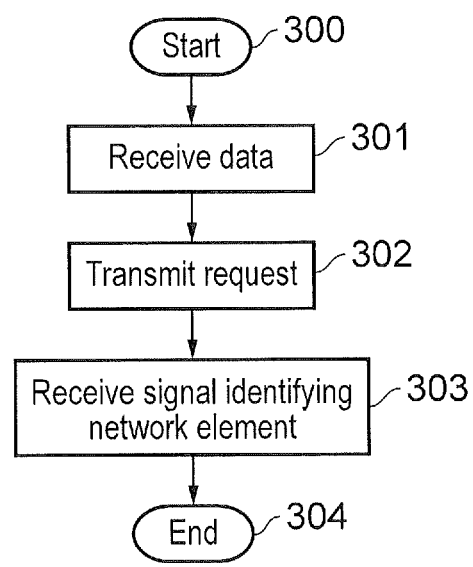
FIGS. 3A to 3B show flow charts illustrating first example processes according to the present technique.

FIG. 3A shows a flow chart illustrating a process of operating the terminal device 102. The process starts at step 300. At step 301, the receiver circuitry 201 receives data from infrastructure equipment of the network via the first communication path through the network. At step 30, the transmitter circuitry 203 transmits, via the second, different, communication path through the network, a request to infrastructure equipment of the network requesting information identifying an element of the network configured to perform a predetermined process associated with the transmission of the data to the receiver circuitry 201. At step 303, the receiver circuitry 201 receives, from infrastructure equipment of the network via the second communication path, the signal identifying the element of the network configured to perform the predetermined process associated with the transmission of the data to the receiver circuitry 201. It is then monitored as to whether a predetermined condition associated with the reception of the data by the receiver circuitry 201 is met and, when it is determined that the predetermined condition is met, the transmitter circuitry 203 transmits a request to infrastructure equipment of the network requesting the identified element of the network to perform the predetermined process associated with the transmission of the data to the receiver circuitry 201. These steps have been discussed in detail previously (and are again described with reference to FIGS. 4A and 4B). The process then ends at step 304.

Figure 3B:
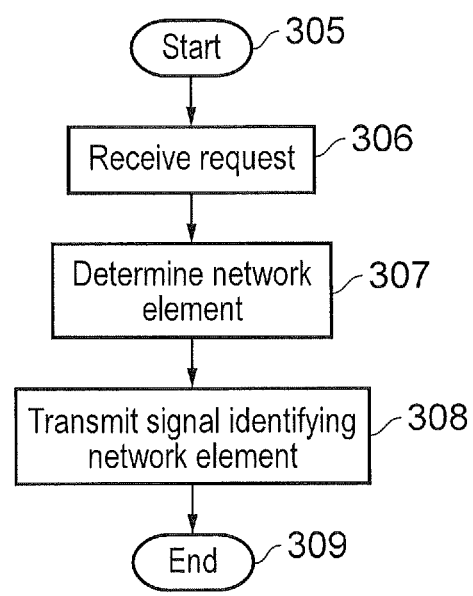

FIG. 3B shows a flow chart illustrating a process of operating a data processing device such as DNS server 105. The process starts at step 305. At step 306, the network interface circuitry 207 receives, via the second communication path through the network, the request from the terminal device 102 requesting information identifying an element of the network configured to perform a predetermined process associated with the transmission of data to the terminal device 102, the data being transmitted to the terminal device 102 from infrastructure equipment of the network via the first, different, communication path through the network. At step 307, based on the received request from the terminal device and information indicative of infrastructure equipment serving the terminal device (such as whether the terminal device 102 is being served by eNB 103A or eNB 103B), the element of the network configured to perform the predetermined process associated with the transmission of the data to the terminal device 102 is determined. At step 308, the network interface circuitry 207 transmits, via infrastructure equipment of the network and via the second communication path, a signal to the terminal device 102 identifying the element of the network configured to perform the predetermined process associated with the transmission of the data to the terminal device 102. The process then ends at step 309.

Figure 4A:
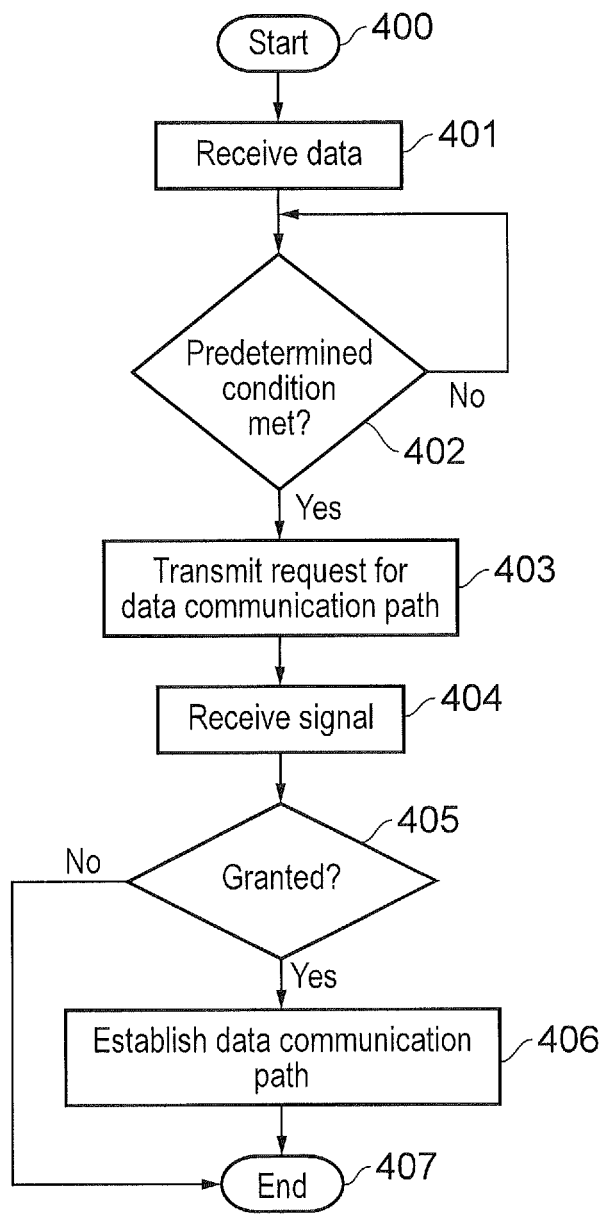
FIGS. 4A to 4B show flow charts illustrating second example processes according to the present technique.

FIG. 4A shows a flow chart illustrating a process of operating the terminal device 102. The process starts at step 400. At step 401, the receiver circuitry 201 receives data from infrastructure equipment of the network. At step 402, it is monitored as to whether a predetermined condition is met, the predetermined condition being met indicating that network assistance by an element of the network for supporting transmission of the data to the receiver circuitry 201 is potentially required. When it is determined that the predetermined condition is met, the process proceeds to step 403, wherein the transmitter circuitry 203 transmits the request to infrastructure equipment of the network requesting that a data communication path be established between the element of the network for providing network assistance and the terminal device 102. Otherwise, the process returns to step 402. At step 404, the receiver circuitry 201 receives, from infrastructure equipment of the network, the signal indicating whether the request for a data communication path to be established between the element of the network for providing network assistance and the terminal device has been granted. At step 405, if it is indicated that the request for a data communication path to be established between the element of the network for providing network assistance and the terminal device has been granted, then the process proceeds to step 406, wherein transmitter circuitry 203 and/or receiver circuitry 201 establish a data communication path between the element of the network for providing network assistance and the terminal device 102. Otherwise, the process ends at step 407. After step 406, the process ends at step 407.

Figure 4B:
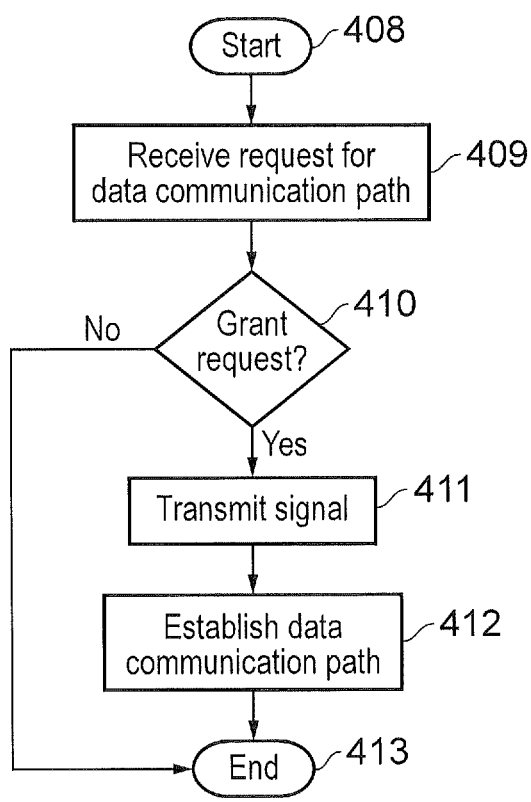

FIG. 4B shows a flow chart illustrating a process of operating a data processing device such as DANE 104A or 104B. The process starts at step 408. At step 409, the network interface circuitry 205 receives the request from the terminal device 102 requesting that a data communication path be established between the data processing device and the terminal device 102, the terminal device 102 transmitting the request when a predetermined condition is met, the predetermined condition being met indicating that network assistance by the data processing device for supporting transmission of data to the terminal device 102 via infrastructure equipment of the network is potentially required. At step 410, if it is determined that the request that a data communication path be established between the data processing device and the terminal device 102 should be granted, the process proceeds to step 411, wherein the network interface circuitry 205 transmits, via infrastructure equipment of the network, the signal to the terminal device indicating that the request has been granted. Otherwise, the process ends at step 413. Alternatively, the network interface circuitry 205 may transmit a signal to the terminal device indicating that the request has not been granted. In an example, the request may be granted if certain predetermined conditions are met. For example, the request may only be granted if the terminal device 102 is configured by the network operator to use network assistance and/or if there is sufficient spare capacity in the network for network assistance to be used (if one or more of these conditions are not met, then the request will not be granted). It will be appreciated that the grant of request may depend on any number of suitable predetermined conditions. Following step 411, the process proceeds to step 412, wherein the network interface circuitry 205 establishes the data communication path between the data processing device and the terminal device 102.

Some embodiments of the present technique are defined by the following numbered clauses:

1. A terminal device for use with a telecommunications network, the terminal device comprising receiver circuitry, transmitter circuitry and processing circuitry, wherein the processing circuitry is configured:

to control the receiver circuitry to receive data from infrastructure equipment of the network via a first communication path through the network;

to control the transmitter circuitry to transmit, via a second, different, communication path through the network, a request to infrastructure equipment of the network requesting information identifying an element of the network configured to perform a predetermined process associated with the transmission of the data to the receiver circuitry;

to control the receiver circuitry to receive, from infrastructure equipment of the network via the second communication path, a signal identifying the element of the network configured to perform the predetermined process associated with the transmission of the data to the receiver circuitry; and to monitor whether a predetermined condition associated with the reception of the data by the receiver circuitry is met and, when it is determined that the predetermined condition is met, to control the transmitter circuitry to transmit a request to infrastructure equipment of the network requesting the identified element of the network to perform the predetermined process associated with the transmission of the data to the receiver circuitry.

2. A terminal device according to clause 1, wherein:
the predetermined process performed by the identified element of the network comprises performing network assistance for supporting transmission of the data to the receiver circuitry.

3. A terminal device according to clause 1 or 2, wherein the identified element of the network is a Dynamic Adaptive Streaming over Hypertext Transfer Protocol (HTTP) (DASH)—aware Network Element (DANE).

4. A terminal device according to any preceding clause, wherein:
the request to infrastructure equipment of the network requesting information identifying the element of the network configured to perform the predetermined process is a Domain Name System (DNS) request transmitted via the second communication path;
the infrastructure equipment of the network at which the DNS request is received via the second communication path is a DNS server configured to determine a suitable element of the network for performing the predetermined process based on a location of the terminal device with respect to the network.

5. A terminal device according to clause 4, wherein the DNS request comprises a Partially-Qualified Domain Name (PQDN) identifying the request as a request for information identifying an element of the network configured to perform the predetermined process.

6. A terminal device according to any preceding clause, wherein, upon handover of the terminal device from first infrastructure equipment of the network to second infrastructure equipment of the network, the processing circuitry is configured:
to control the receiver circuitry to receive, from infrastructure equipment of the network via the second communication path, a signal newly identifying an element of the network configured to perform the predetermined process, the newly identified element of the network being one of the previously identified element of the network and a different element of the network; and
to monitor whether the predetermined condition associated with the reception of the data by the receiver circuitry is met and, when it is determined that the predetermined condition is met, to control the transmitter circuitry to transmit a request to infrastructure equipment of the network requesting the newly identified element of the network to perform the predetermined process.

7. A terminal device according to clause 6, wherein the receiver circuitry receives the signal newly identifying an element of the network configured to perform the predetermined process in response to the processing circuitry controlling the transmitter circuitry to transmit a further request to infrastructure equipment of the network requesting information newly identifying an element of the network configured to perform the predetermined process.

8. A terminal device for use with a telecommunications network, the terminal device comprising receiver circuitry, transmitter circuitry and processing circuitry, wherein the processing circuitry is configured:
to control the receiver circuitry to receive data from infrastructure equipment of the network;
to monitor whether a predetermined condition is met, the predetermined condition being met indicating that network assistance by an element of the network for supporting transmission of the data to the receiver circuitry is potentially required, and, when it is determined that the predetermined condition is met, to control the transmitter circuitry to transmit a request to infrastructure equipment of the network requesting that a data communication path be established between the element of the network for providing network assistance and the terminal device;
to control the receiver circuitry to receive, from infrastructure equipment of the network, a signal indicating whether the request for a data communication path to be established between the element of the network for providing network assistance and the terminal device has been granted; and
when it is indicated that the request for a data communication path to be established between the element of the network for providing network assistance and the terminal device has been accepted, to control the transmitter circuitry and/or receiver circuitry to establish a data communication path between the element of the network for providing network assistance and the terminal device.

9. A terminal device according to clause 8, wherein:
the data received from the infrastructure equipment is audio and/or video data; and
the predetermined condition comprises one or more of the terminal device being in a mode such the processing circuitry is configured to control the transmitter and receiver circuitry to send and receive signals, an application which enables audio and/or video data to be viewed being executed by the processing circuitry, and a command to view particular audio and/or video data being executed by the processing circuitry.

10. A terminal device according to clause 8 or 9, wherein, when a data communication path between the element of the network for providing network assistance and the terminal device has been established, the processing circuitry is configured:
to monitor whether a further predetermined condition is met, the further predetermined condition being met indicating that network assistance by an element of the network for supporting transmission of the data to the receiver circuitry is no longer potentially required, and, when it is determined that the further predetermined condition is met, to control the transmitter circuitry to transmit a request to infrastructure equipment of the network requesting that the data communication path between the element of the network for providing network assistance and the terminal device be disconnected;
to control the receiver circuitry to receive, from infrastructure equipment of the network, a signal indicating whether the request for the data communication path to be disconnected has been granted; and
when it is indicated that the request for the data communication path to be disconnected has been accepted, the processing circuitry is configured to control the transmitter circuitry and/or receiver circuitry to disconnect the data communication path between the element of the network for providing network assistance and the terminal device.

11. A terminal device according to clause 10, wherein:
the data received from the infrastructure equipment is audio and/or video data; and
the further predetermined condition comprises one or more of execution by the processing circuitry of a command to view particular audio and/or video data being stopped, execution by the processing circuitry of an application which enables audio and/or video data to be viewed being stopped, and the terminal device being in a mode such the processing circuitry is configured to control the transmitter and receiver circuitry not to send and receive signals.

12. A terminal device according to clause 10 or 11, wherein the request transmitted to infrastructure equipment of the network requesting that the data communication path between the element of the network for providing network assistance and the terminal device be disconnected is provided with a Server and Network-assisted Dynamic Adaptive Streaming over Hypertext Transfer Protocol (HTTP) (DASH) (SAND) message.

13. A terminal device according to clause 12, wherein the SAND message is a SAND message comprising an extension comprising the request that the data communication path between the element of the network for providing network assistance and the terminal device be disconnected.

14. A terminal device according to clause 13, wherein the extension of the SAND message is comprised within the 3GPP namespace.

15. A terminal device according to clause 12, wherein the request that the data communication path between the element of the network for providing network assistance and the terminal device be disconnected is provided with the SAND message in the SAND message envelope.

16. A terminal device according to any one of clauses 8 to 15, wherein the request transmitted to infrastructure equipment of the network requesting that a data communication path be established between the element of the network for providing network assistance and the terminal device is provide with a Server and Network-assisted Dynamic Adaptive Streaming over Hypertext Transfer Protocol (HTTP) (DASH) (SAND) message.

17. A terminal device according to clause 16, wherein the SAND message is a SAND message comprising an extension comprising the request that a data communication path be established between the element of the network for providing network assistance and the terminal device.

18. A terminal device according to clause 17, wherein the extension of the SAND message is comprised within the 3GPP namespace.

19. A terminal device according to clause 16, wherein the request that the data communication path be established between the element of the network for providing network assistance and the terminal device is provided with the SAND message in the SAND message envelope.

20. A terminal device according to any one of clauses 8 to 19, wherein, when a data communication path between the element of the network for providing network assistance and the terminal device has been established, the processing circuitry is configured:
  to control the transmitter circuitry to transmit, via the established data communication path, a request to the element of the network for providing network assistance requesting information identifying an estimated and recommended highest rate from a predetermined plurality of rates available at the terminal device at which the data may be transmitted to the receiver circuitry by the infrastructure equipment of the network;
  to control the receiver circuitry to receive, from the element of the network for providing network assistance via the established communication path, a signal indicating the identified estimated and recommended highest rate at which the data may be transmitted to the receiver circuitry by the infrastructure equipment of the network; and
  to control the receiver circuitry to receive the data from the infrastructure equipment at a rate based on the indicated estimated and recommended highest data rate.

21. A terminal device according to clause 20, wherein the request transmitted to the element of the network for providing network assistance requesting information identifying the estimated and recommended highest rate at which the data may be transmitted to the receiver circuitry by the infrastructure equipment of the network is provided with a Server and Network-assisted Dynamic Adaptive Streaming over Hypertext Transfer Protocol (HTTP) (DASH) (SAND) message.

22. A terminal device according to clause 21, wherein the SAND message is a SAND message comprising an extension comprising the request requesting information identifying the estimated and recommended highest rate at which the data may be transmitted to the receiver circuitry by the infrastructure equipment of the network.

23. A terminal device according to clause 22, wherein the extension of the SAND message is comprised within the 3GPP namespace.

24. A terminal device according to clause 21, wherein the request requesting information identifying the estimated and recommended highest rate at which the data may be transmitted to the receiver circuitry by the infrastructure equipment of the network is provided with the SAND message in the SAND message envelope.

25. A terminal device according to any one of clauses 20 to 24, wherein, when a data communication path between the element of the network for providing network assistance and the terminal device has been established, the processing circuitry is configured:
  to monitor whether a data boost predetermined condition is met, the data boost predetermined condition being met indicating that additional communication resources are required for transmission of the data from the infrastructure equipment of the network to the receiver circuitry, and, when it is determined that the data boost predetermined condition is met, to control the transmitter circuitry to transmit, via the established data communication path, a request to the element of the network for providing network assistance requesting additional communication resources to be made available for transmission of the data from the infrastructure equipment to the receiver circuitry;
  to control the receiver circuitry to receive, from the element of the network for providing network assistance via the established data communication path, a signal indicating whether the request for additional network resources to be made available has been granted; and
  when it is indicated that the request for additional communication resources to be made available has been granted, to control the receiver circuitry to receive the data from the infrastructure equipment using the additional communication resources.

26. A terminal device according to clause 25, comprising a data buffer configured to temporarily store data from the infrastructure equipment of the network, wherein the data boost predetermined condition comprises the data buffer storing less than a predetermined amount of data.

27. A terminal device according to clause 25 or 26, wherein the request transmitted to the element of the network for providing network assistance requesting additional communication resources to be made available for transmission of the data from the infrastructure equipment to the receiver circuitry is provided with a Server and Network-assisted Dynamic Adaptive Streaming over Hypertext Transfer Protocol (HTTP) (DASH) (SAND) message.

28. A terminal device according to clause 27, wherein the SAND message is a SAND message comprising an extension comprising the request requesting additional communication resources to be made available for transmission of the data from the infrastructure equipment to the receiver circuitry.

29. A terminal device according to clause 28, wherein the extension of the SAND message is comprised within the 3GPP namespace.

30. A terminal device according to clause 27, wherein the request requesting additional communication resources to be made available for transmission of the data from the infrastructure equipment to the receiver circuitry is provided with the SAND message in the SAND message envelope.

31. A terminal device according to any one of clauses 27 to 30, wherein:
  (a) the request transmitted to the element of the network for providing network assistance requesting information identifying the estimated and recommended highest rate at which the data may be transmitted to the receiver circuitry by the infrastructure equipment of the network, and
  (b) the request transmitted to the element of the network for providing network assistance requesting additional communication resources to be made available for transmission of the data from the infrastructure equipment to the receiver circuitry
  are comprised within the same SAND message.

32. A method of operating terminal device for use with a telecommunications network, the terminal device comprising receiver circuitry and transmitter circuitry, wherein the method comprises:
  controlling the receiver circuitry to receive data from infrastructure equipment of the network via a first communication path through the network;
  controlling the transmitter circuitry to transmit, via a second, different, communication path through the network, a request to infrastructure equipment of the network requesting information identifying an element of the network configured to perform a predetermined process associated with the transmission of the data to the receiver circuitry;
  controlling the receiver circuitry to receive, from infrastructure equipment of the network via the second communication path, a signal identifying the element of the network configured to perform the predetermined process associated with the transmission of the data to the receiver circuitry; and
  monitoring whether a predetermined condition associated with the reception of the data by the receiver circuitry is met and, when it is determined that the predetermined condition is met, to control the transmitter circuitry to transmit a request to infrastructure equipment of the network requesting the identified element of the network to perform the predetermined process associated with the transmission of the data to the receiver circuitry.

33. A computer program for controlling a computer to perform a method according to clause 32.

34. An application programming interface (API) for building a computer program according to clause 33.

35. A storage medium storing a computer program according to clause 33.

36. A method of operating a terminal device for use with a telecommunications network, the terminal device comprising receiver circuitry and transmitter circuitry, wherein the method comprises:
  controlling the receiver circuitry to receive data from infrastructure equipment of the network;
  monitoring whether a predetermined condition is met, the predetermined condition being met indicating that network assistance by an element of the network for supporting transmission of the data to the receiver circuitry is potentially required, and, when it is determined that the predetermined condition is met, controlling the transmitter circuitry to transmit a request to infrastructure equipment of the network requesting that a data communication path be established between the element of the network for providing network assistance and the terminal device;
  controlling the receiver circuitry to receive, from infrastructure equipment of the network, a signal indicating whether the request for a data communication path to be established between the element of the network for providing network assistance and the terminal device has been granted; and
  when it is indicated that the request for a data communication path to be established between the element of the network for providing network assistance and the terminal device has been accepted, controlling the transmitter circuitry and/or receiver circuitry to establish a data communication path between the element of the network for providing network assistance and the terminal device.

37. A computer program for controlling a computer to perform a method according to clause 29.

38. An application programming interface (API) for building a computer program according to clause 37.

39. A storage medium storing a computer program according to clause 37.

40. A data processing device for use with a telecommunications network, the data processing device comprising processing circuitry and network interface circuitry, wherein the processing circuitry is configured:
  to control the network interface circuitry to receive, via a second communication path through the network, a request from a terminal device requesting information identifying an element of the network configured to perform a predetermined process associated with the transmission of data to the terminal device, the data being transmitted to the terminal device from infrastructure equipment of the network via a first, different, communication path through the network;
  based on the received request from the terminal device and information indicative of infrastructure equipment serving the terminal device, to determine the element of the network configured to perform the predetermined process associated with the transmission of the data to the terminal device;
  to control the network interface circuitry to transmit, via infrastructure equipment of the network and via the second communication path, a signal to the terminal device identifying the element of the network configured to perform the predetermined process associated with the transmission of the data to the terminal device.

41. A data processing device for providing network assistance for supporting transmission of data to a terminal device via infrastructure equipment of a telecommunications network, the data processing device comprising processing circuitry and network interface circuitry, wherein the processing circuitry is configured:

to control the network interface circuitry to receive a request from the terminal device requesting that a data communication path be established between the data processing device and the terminal device, the terminal device transmitting the request when a predetermined condition is met, the predetermined condition being met indicating that network assistance by the data processing device for supporting transmission of data to the terminal device via infrastructure equipment of the network is potentially required;

to determine whether the request that a data communication path be established between the data processing device and the terminal device should be granted and to control the network interface circuitry to transmit, via infrastructure equipment of the network, a signal to the terminal device indicating whether the request has been granted; and when the request has been granted, to control the network interface circuitry to establish a data communication path between the data processing device and the terminal device.

42. A method of operating a data processing device for use with a telecommunications network, the data processing device comprising network interface circuitry, wherein the method comprises:

controlling the network interface circuitry to receive, via a second communication path through the network, a request from a terminal device requesting information identifying an element of the network configured to perform a predetermined process associated with the transmission of data to the terminal device, the data being transmitted to the terminal device from infrastructure equipment of the network via a first, different, communication path through the network;

based on the received request from the terminal device and information indicative of infrastructure equipment serving the terminal device, determining the element of the network configured to perform the predetermined process associated with the transmission of the data to the terminal device; and controlling the network interface circuitry to transmit, via infrastructure equipment of the network and via the second communication path, a signal to the terminal device identifying the element of the network configured to perform the predetermined process associated with the transmission of the data to the terminal device.

43. A storage medium storing a computer program for controlling a computer to perform a method according to clause 42.

44. A method of operating a data processing device for providing network assistance for supporting transmission of data to a terminal device via infrastructure equipment of a telecommunications network, the data processing device comprising network interface circuitry, wherein the method comprises:

controlling the network interface circuitry to receive a request from the terminal device requesting that a data communication path be established between the data processing device and the terminal device, the terminal device transmitting the request when a predetermined condition is met, the predetermined condition being met indicating that network assistance by the data processing device for supporting transmission of data to the terminal device via infrastructure equipment of the network is potentially required;

determining whether the request that a data communication path be established between the data processing device and the terminal device should be granted and controlling the network interface circuitry to transmit, via infrastructure equipment of the network, a signal to the terminal device indicating whether the request has been granted; and when the request has been granted, controlling the network interface circuitry to establish a data communication path between the data processing device and the terminal device.

45. A storage medium storing a computer program for controlling a computer to perform a method according to clause 44.

46. A system comprising a terminal device according to clause 1 and a data processing device according to clause 40.

47. A system comprising a terminal device according to clause 8 and a data processing device according to clause 41.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

The following references are incorporated in the present application in their entirety by reference.

[1] ISO/IEC 23009-1, Information technology—Dynamic adaptive streaming over HTTP (DASH)—Part 1: Media presentation description and segment formats

[2] ISO/IEC 23009-5, Information Technology—Dynamic adaptive streaming over HTTP (DASH)—Part 5: Server and network assisted DASH (SAND)
[3] 3GPP TS 26.247, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)
[4] 3GPP TS 26.233, 3rd Generation Partnership Project; Technical Specification Group Services and System Aspects; Transparent end-to-end packet-switched streaming service (PSS); General description (Release 13)
[5] 3GPP TR 26.957 FS_SAND (http://www.3gpp.org/ftp/Specs/archive/26_series/26.957/26957-e10.zip)
[6] IETF RFC 1035 Doman Names—Implementation and Specification
[7] IETF RFC 6455; The WebSocket Protocol

The invention claimed is:

1. A terminal device for use with a telecommunications network, the terminal device comprising receiver circuitry, transmitter circuitry and processing circuitry, wherein the processing circuitry is configured:
to control the receiver circuitry to receive data from infrastructure equipment of the network via a first communication path through the network;
to control the transmitter circuitry to transmit, via a second, different, communication path through the network, a first request to the infrastructure equipment of the network requesting information identifying an element of the network that is configured to perform a predetermined process associated with transmission of the data to the receiver circuitry;
to control the receiver circuitry to receive, from the infrastructure equipment of the network via the second communication path, a signal identifying the element of the network configured to perform the predetermined process; and
to monitor whether a predetermined condition associated with reception of the data by the receiver circuitry is met and, when determined that the predetermined condition is met, to control the transmitter circuitry to transmit a second request to the infrastructure equipment of the network requesting the identified element of the network to perform the predetermined process,
wherein the first request is indicative of a selected mode of a plurality of modes associated with the predetermined process,
wherein the identified element of the network is a Dynamic Adaptive Streaming over Hypertext Transfer Protocol (HTTP) (DASH)—aware Network Element (DANE), and
wherein the signal identifies the element of the network in accordance with the selected mode.

2. The terminal device of claim 1,
wherein the plurality of modes comprise performing network assistance for supporting transmission of the data to the receiver circuitry, proxy caching, and quality of service management.

3. The terminal device according to claim 1, wherein the identified element of the network is a Dynamic Adaptive Streaming over Hypertext Transfer Protocol (HTTP) (DASH)—aware Network Element (DANE).

4. The terminal device according to claim 3, wherein the first request is a Domain Name System (DNS) request comprising a Fully-Qualified Domain Name (FQDN).

5. The terminal device according to claim 1, wherein, upon handover of the terminal device from first infrastructure equipment of the network to second infrastructure equipment of the network, the processing circuitry is configured:
to control the receiver circuitry to receive, from the infrastructure equipment of the network via the second communication path, a signal newly identifying an element of the network configured to perform the predetermined process, the newly identified element of the network being one of the previously identified element of the network or a different element of the network; and
to monitor whether the predetermined condition associated with the reception of the data by the receiver circuitry is met and, when it is determined that the predetermined condition is met, to control the transmitter circuitry to transmit the second request to the infrastructure equipment of the network requesting the newly identified element of the network to perform the predetermined process.

6. The terminal device according to claim 5, wherein the receiver circuitry receives the signal newly identifying the element of the network, which is configured to perform the predetermined process.

7. A method of operating terminal device for use with a telecommunications network, the terminal device comprising receiver circuitry and transmitter circuitry, wherein the method comprises:
controlling the receiver circuitry to receive data from infrastructure equipment of the network via a first communication path through the network;
controlling the transmitter circuitry to transmit, via a second, different, communication path through the network, a first request to the infrastructure equipment of the network requesting information identifying an element of the network configured to perform a predetermined process associated with the transmission of the data to the receiver circuitry;
controlling the receiver circuitry to receive, from the infrastructure equipment of the network via the second communication path, a signal identifying the element of the network configured to perform the predetermined process associated with the transmission of the data to the receiver circuitry; and
monitoring whether a predetermined condition associated with the reception of the data by the receiver circuitry is met and, when it is determined that the predetermined condition is met, to control the transmitter circuitry to transmit a second request to the infrastructure equipment of the network requesting the identified element of the network to perform the predetermined process associated with the transmission of the data to the receiver circuitry,
wherein the first request is indicative of a selected mode of a plurality of modes associated with the predetermined process,
wherein the identified element of the network is a Dynamic Adaptive Streaming over Hypertext Transfer Protocol (HTTP) (DASH)—aware Network Element (DANE), and
wherein the signal identifies the element of the network in accordance with the selected mode.

* * * * *